Dec. 29, 1959  E. B. MAGEE  2,919,110
FAIRLEAD

Filed March 18, 1958  2 Sheets-Sheet 1

Inventor
EDWARD B. MAGEE
By Cushman, Darby & Cushman
Attorneys

Dec. 29, 1959  E. B. MAGEE  2,919,110
FAIRLEAD

Filed March 18, 1958  2 Sheets-Sheet 2

Inventor:
EDWARD B. MAGEE
By Cushman, Darby & Cushman
Attorneys

United States Patent Office 2,919,110
Patented Dec. 29, 1959

2,919,110

FAIRLEAD

Edward B. Magee, Port Colborne, Ontario, Canada

Application March 18, 1958, Serial No. 722,174

Claims priority, application Canada February 10, 1958

4 Claims. (Cl. 254—190)

This invention relates to fairleads for ropes, cables and the like.

As is known, warping of ships is effected through the intermediary of ropes, cables and the like which pass from the ship to the docking installations on the shore and such ropes or cables must, of necessity, pass through fairleads or cleats, or around bollards located in convenient positions on the decks of said ships. Due to the increasing size and tonnage of ocean-going ships, warping is generally effected by steel hawsers or manila cables the ends of which are whipped and eyeleted to add strength thereto and to prevent unravelling of the various strands. Thus, whereas the diameter of the cable itself may be as great as two inches or more, the diameter of its eyeleted ends is much greater, so that with hitherto known types of fairleads employing a cable-receiving throat designed to receive a cable having a specified diameter, it is impossible for the eyeleted end to pass through the throat if the latter has been constructed to receive a cable of a certain diameter.

It is the object of this invention to overcome the above disadvantage by providing a fairlead having novel means whereby the operative area of the throat can be varied so as to permit the insertion of a cable eye therethrough and, thereafter, the operative area of the throat can be reduced so that the cable proper may pass therethrough.

According to one aspect of this invention, a fairlead is provided with a fixed frame; a freely rotatable housing mounted within said frame; a first member fixed to and rotatable with said housing; a pair of freely rotatable sheaves mounted on said fixed member in coplanar and parallel relationship; a pair of spaced members fixed to and rotatable with said housing and arranged at an angle to said first member; all of said members, together with the peripheries of said sheaves and the housing defining a cable eye receiving throat; and a movable member mounted within said housing and adapted to reduce the operative area of said throat when said cable eye has passed therethrough whereby the cable proper is adapted to be located and maintained within that portion of the throat defined by said first member, the peripheries of said sheaves and said movable member.

The invention is illustrated in the accompanying drawings, in which.

Figure 2:
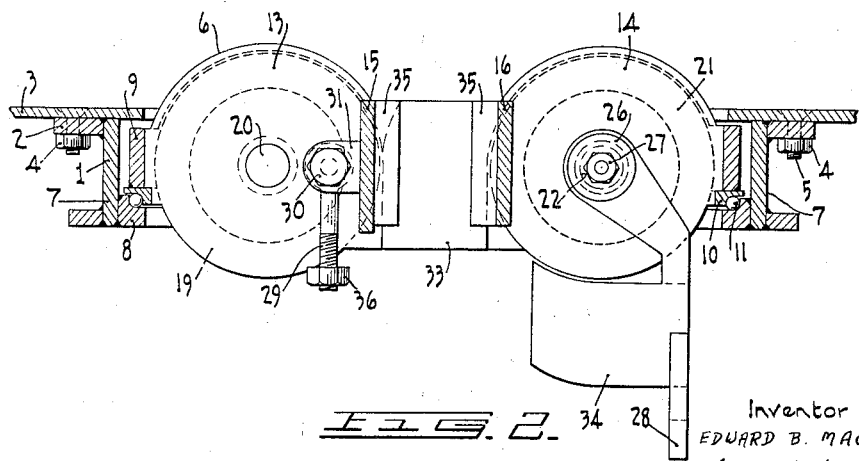
Figure 2 is a transverse section taken on the line 2—2 of Figure 1.
Figure 4:
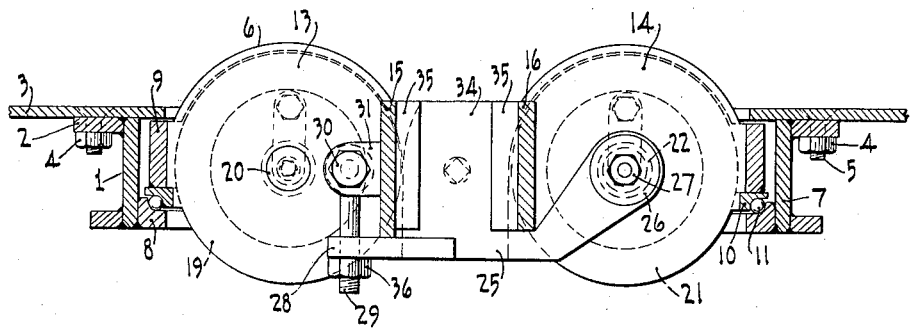
Figure 4 is a transverse section taken on the line 4—4 of Figure 3.

Referring to the drawings, the fairlead includes fixed frame indicated generally at 1, having a flange 2 which is placed in position against the bulwark 3 of a ship, in any convenient location, and detachably secured thereto by means of nuts 4 and bolts 5 (see Figures 2 and 4).

The fixed frame 1 has a housing 6 freely rotatable therein.

The fixed frame 1 has a cylindrical wall structure 7 which is provided with a further flange 8 adapted to maintain the housing 6 within said fixed frame.

The housing 6, being also of substantially cylindrical form, is provided with an outer wall 9 having a circular ring member 10 secured thereto, the latter being welded to the edge of the outer wall 9 and serving to define an annular recess at the upper edge thereof as will be described hereinafter.

Ball bearings 11 are arranged in position between the flange 8 of the fixed frame 1 and the ring member 10 of the freely rotatable housing 6 and the above-mentioned annular recess in the ring member 10 coincides with a further annular recess in the inwardly projecting flange 8, the ball bearings operating within said annular recesses. Thus, the housing 6 is free to rotate, through the intermediary of the ball bearings 11, with the fixed frame 1.

Figure 3:
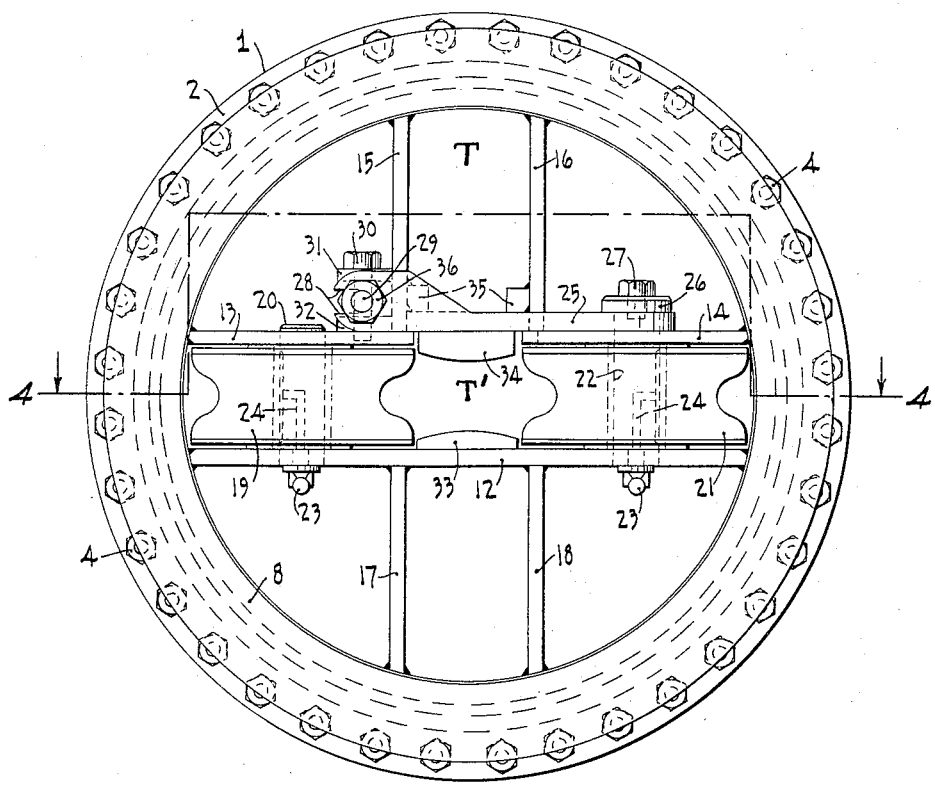
Figure 3 is a front elevation of the fairlead showing the movable member in its operative or closed position.

More particularly, the freely rotatable housing 6 is provided with a fixed horizontal web 12 (see Figures 1 and 3) offset a predetermined distance from the horizontal axis of the housing 6. Secured by means of welding to the inner periphery of the housing 6, and also offset a predetermined distance from the horizontal axis thereof, are a pair of fixed horizontal members 13, 14 which are spaced apart at their inner ends, said inner ends being welded to the inner ends of a pair of vertical members 15, 16 which are, themselves, welded at their outer ends to the inner periphery of the housing 6 and offset a predetermined distance from the vertical axis of the housing as well as being at an angle to the fixed horizontal web 12.

Welded to the underside of the fixed horizontal web 12, as well as to the inner periphery of the housing 6, are a pair of vertical member 17, 18 corresponding to the vertical members 15, 16, and also offset a predetermined distance from the vertical axis of the housing 6.

Located between the fixed horizontal member 13 and the fixed horizontal web 12 is a freely rotatable sheave 19 mounted no a vertical stub shaft 20 extending through the fixed member 13 and web 12. Similarly, a freely rotatable sheave 21 is located between the fixed horizontal member 14 and the fixed horizontal web 12, said sheave being mounted for rotation upon a vertical stub shaft 22, both of said sheaves 19 and 21 being provided with suitable bearings in which their associated stud shafts are mounted, said bearings being supplied with lubricant which passes through lubricant introducing means 23 and lubricant passageways 24, said lubricant introducing means 23 being located in one end of each stub shaft 19, 21, whereas said passageways 24 are coaxially bored through each of said shafts.

It will be appreciated, from reference to the drawings, that the sheaves 19 and 21 are in coplanar and parallel relationship with one another.

A cable eye receiving throat indicated generally at T is thus formed which is defined by the vertical members 15, 16, the peripheries of the sheaves 19, 21 and a guide member 33, fast with the upper surface of the fixed horizontal web 12.

The operative area of the throat T can be reduced by means of a horizontal member 25 which is pivotally mounted, at one end thereof, to the upper end of the vertical stub shaft 22 and located in position thereon by means of a washer 26 and headed pivot bolt 27. The end of the movable member 25, remote from its pivotal end, is bifurcated as can be seen from Figure 3 and as indicated at 28, said bifurcation being engageable with a horizontally extending bolt 29 which, at one end thereof, is pivotally mounted on a vertical bolt 30 extending between upper and lower extensions 31, 32 projecting from the vertical member 15.

The guide member 33, fast with the upper surface of the fixed web 12, combined with a coacting guide member 34 projecting from the underside of the movable member 25, serves to guide the cable C into one or other of the peripheral grooves of the sheaves 19, 21, depending upon the relative orientation of the cable C to the ship.

Figure 1:
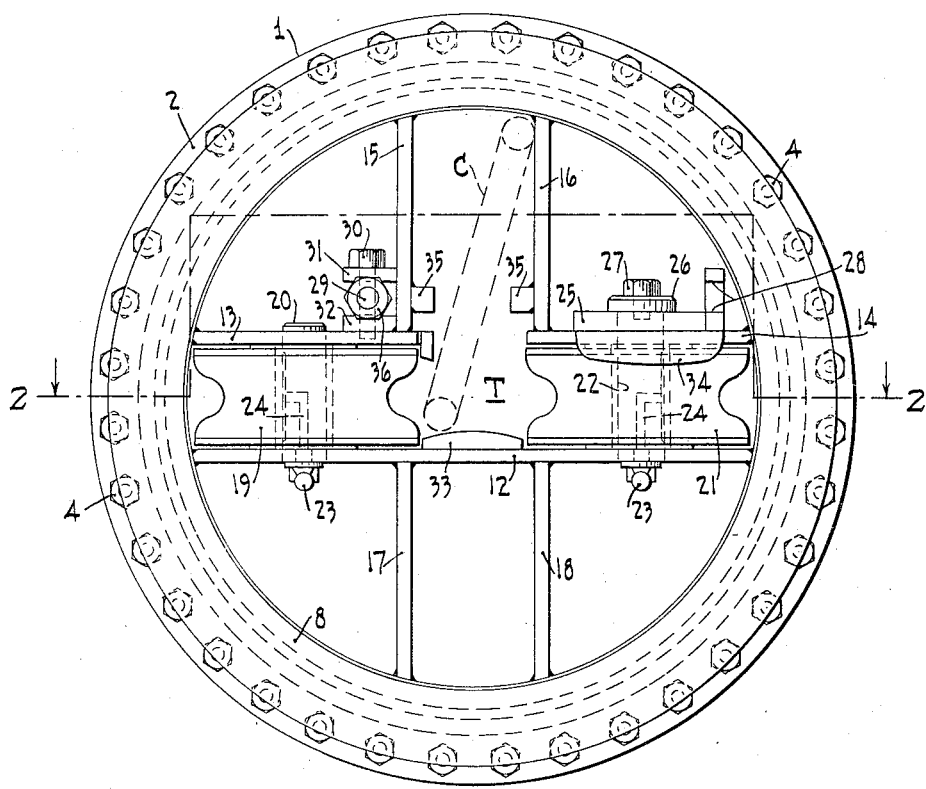
Figure 1 is a front elevation of a fairlead showing the movable member in its inoperative or open position.

In operation, the movable member 25 is normally in its open or inoperative position as shown in Figures 1 and 2. The eye (see Figure 1) of the cable C is inserted into throat T of the fairlead and pulled therethrough until the cable proper is located between the peripheries of the sheaves 19, 21 and over the guide member 33 located on the fixed horizontal web 12. When the cable proper has reached this position, the movable member 25 is swung about its pivot 27, taking up the position shown in Figures 3 and 4 so that the operative area of the throat T will be reduced, the cable thereby being maintained in the reduced portion T' (see Figure 3) of the throat defined by the guide member 33, the peripheries of the sheaves 19 and 21 and the movable member 25, said movable member 25 being located under a pair of strengthening members 35 welded to the inner face of each of the vertical members 15 and 16. The bifurcated end 28 of the movable member 25 will now be in position where it can be detachably engaged by connecting means on the vertical member 15, said means being constituted by the horizontal bolt 29 and an adjustment nut 36, so that the cable proper will be maintained within the confines of the restricted area of the throat T.

From the above description, it will be appreciated that the size of the unrestricted throat T will permit easy insertion of the cable eye and thereafter, when the eye of the cable has passed through the throat and the cable proper is within the throat, the movable member 25 will reduce the operative area of the throat and thereby maintain said cable proper in correct working relationship, with the sheaves 19 and 21, whilst in the restricted portion T' of the throat.

I claim:

1. A fairlead having a fixed frame; a freely rotatable housing mounted within said frame; a first member fixed to and rotatable with said housing; a pair of freely rotatable sheaves mounted on said fixed member in coplanar and parallel relationship; a pair of spaced members fixed to and rotatable with said housing and arranged at an angle to said first member; all of said members, together with the peripheries of said sheaves and the housing defining a cable eye receiving throat; and a movable member mounted within said housing and adapted to reduce the operative area of said throat when said cable eye has passed therethrough whereby the cable proper is adapted to be located and maintained within that portion of the throat defined by said first member, the peripheries of said sheaves and said movable member.

2. A fairlead having a fixed frame; a freely rotatable housing mounted within said frame; a first member fixed to and rotatable with said housing; a pair of shafts mounted on said first member; a pair of freely rotatable sheaves mounted on said shafts in coplanar and parallel relationship; a pair of spaced members fixed to and rotatable with said housing and arranged at an angle to said first member; all of said members, together with the peripheries of said sheaves and the housing defining a cable eye receiving throat; and a movable member pivotally mounted on one of said shafts and adapted to reduce the operative area of said throat when said cable eye has passed therethrough whereby the cable proper is adapted to be located and maintained within that portion of the throat defined by said first member, the peripheries of said sheaves and said movable member.

3. A fairlead having a fixed frame; a freely rotatable housing mounted within said frame; a first member fixed to and rotatable with said housing; a pair of shafts mounted on said first member; a pair of freely rotatable sheaves mounted on said shafts in coplanar and parallel relationship; a pair of spaced members fixed to and rotatable with said housing and arranged at an angle to said first member; all of said members, together with the peripheries of said sheaves and the housing defining a cable eye receiving throat; and a movable member pivotally mounted, at one end thereof, on one of said shafts and adapted, on movement in one direction, to reduce the operative area of said throat when said cable eye has passed therethrough and to be detachably secured at its other end to one of said pair of spaced members whereby the cable proper is adapted to be located and maintained within that portion of the throat defined by said first member, the peripheries of said sheaves and said movable member.

4. A fairlead having a fixed frame; a freely rotatable housing mounted within said frame; a first member fixed to and rotatable with said housing; a pair of shafts mounted on said first member; a pair of freely rotatable sheaves mounted on said shafts in coplanar and parallel relationship; a pair of spaced members fixed to and rotatable with said housing and arranged at an angle to said first member; all of said members, together with the peripheries of said sheaves and the housing defining a cable eye receiving throat; a movable member pivotally mounted, at one end thereof, on one of said shafts and adapted, on movement in one direction, to reduce the operative area of said throat when said cable eye has passed therethrough whereby the cable proper is adapted to be located and maintained within that portion of the throat defined by said first member, the peripheries of said sheaves and said movable member, and connecting means on one of said pair of spaced members for detachably securing the remaining end of said movable member thereto.

References Cited in the file of this patent

UNITED STATES PATENTS

| | | |
|---|---|---|
| 1,672,823 | McMillan | June 5, 1928 |
| 1,887,306 | Huff | Nov. 8, 1932 |
| 1,943,433 | Heighton | Jan. 16, 1934 |
| 2,164,894 | Bentley | July 4, 1939 |